(12) United States Patent
Rofougaran

(10) Patent No.: US 7,917,112 B2
(45) Date of Patent: Mar. 29, 2011

(54) METHOD AND SYSTEM FOR DYNAMICALLY TUNING AND CALIBRATING AN ANTENNA USING ANTENNA HOPPING

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/710,207

(22) Filed: Feb. 22, 2010

(65) Prior Publication Data

US 2010/0150287 A1   Jun. 17, 2010

Related U.S. Application Data

(63) Continuation of application No. 11/536,682, filed on Sep. 29, 2006, now Pat. No. 7,689,188.

(51) Int. Cl.
*H04B 1/18* (2006.01)

(52) U.S. Cl. ................................. 455/193.1; 455/121

(58) Field of Classification Search ............ 455/193.1, 455/193.2, 193.3, 562.1, 120, 121, 123, 124, 455/125, 269, 273, 276.1
See application file for complete search history.

(56) References Cited

U.S. PATENT DOCUMENTS

| | | | |
|---|---|---|---|
| 4,689,803 A | | 8/1987 | Johnnessen et al. |
| 5,052,049 A | * | 9/1991 | Andros et al. ............. 455/186.1 |
| 5,191,598 A | | 3/1993 | Backstrom |
| 5,301,358 A | * | 4/1994 | Gaskill et al. ............. 455/193.2 |
| 5,475,581 A | | 12/1995 | Lansberry |
| 5,483,688 A | * | 1/1996 | English et al. ............. 455/184.1 |
| 5,589,844 A | * | 12/1996 | Belcher et al. ................ 343/860 |
| 6,301,231 B1 | | 10/2001 | Hassan |
| 6,566,774 B2 | * | 5/2003 | Parmeter et al. ................ 310/90 |
| 6,594,241 B1 | | 7/2003 | Malmlof |
| 6,842,440 B2 | | 1/2005 | Paneth et al. |
| 6,937,592 B1 | | 8/2005 | Heath |
| 7,127,217 B2 | * | 10/2006 | Tuttle et al. ..................... 455/87 |
| 7,142,833 B2 | | 11/2006 | Hibino et al. |
| 7,260,424 B2 | | 8/2007 | Schmidt |
| 7,295,822 B2 | | 11/2007 | Sano |
| 7,426,373 B2 | | 9/2008 | Clingman et al. |
| 7,463,870 B2 | * | 12/2008 | Peusens et al. ............... 455/130 |
| 7,689,188 B2 | * | 3/2010 | Rofougaran ............... 455/193.1 |
| 2003/0054772 A1 | | 3/2003 | Majaniemi |
| 2003/0169706 A1 | | 9/2003 | Poegel |

(Continued)

FOREIGN PATENT DOCUMENTS

JP          2006180453          7/2006

(Continued)

*Primary Examiner* — Blane J Jackson

(74) *Attorney, Agent, or Firm* — McAndrews, Held & Malloy, Ltd.

(57) ABSTRACT

Methods and systems for dynamically tuning and calibrating an antenna using antenna hopping are disclosed. In this regard, in a wireless device comprising an antenna that is configurable into a plurality of configurations, determining a subset of the configurations, where each configuration of the subset enables received signal strength above a threshold for a wireless channel, may be determined. During a time interval in which the wireless device is receiving signals on the wireless channel, the antenna may be configured to sequentially utilize each configuration of the subset. During the time interval, a plurality of samples of the wireless channel may be generated, where each of the samples corresponds to a different one of the configurations of the subset. The plurality of samples may be aggregated. The aggregated samples may be processed to recover information communicated on the wireless channel.

20 Claims, 5 Drawing Sheets

U.S. PATENT DOCUMENTS

| | | |
|---|---|---|
| 2003/0193923 A1 | 10/2003 | Abdelgany |
| 2004/0131014 A1 | 7/2004 | Thompson |
| 2004/0196813 A1 | 10/2004 | Ofek |
| 2004/0252060 A1 | 12/2004 | Matsubara |
| 2005/0176436 A1 | 8/2005 | Mantravadi |
| 2005/0180375 A1 | 8/2005 | Batra |
| 2005/0245202 A1 | 11/2005 | Ranta |
| 2005/0266811 A1 | 12/2005 | Weiss |
| 2006/0023666 A1 | 2/2006 | Jalali |
| 2006/0160501 A1* | 7/2006 | Mendolia et al. ............. 455/125 |
| 2006/0281423 A1 | 12/2006 | Caimi et al. |
| 2007/0030918 A1 | 2/2007 | Kobayashi |
| 2007/0032238 A1 | 2/2007 | Kim |
| 2007/0242773 A1 | 10/2007 | Li |
| 2008/0080418 A1 | 4/2008 | Rofougaran |
| 2008/0080452 A1 | 4/2008 | Rofougaran |

FOREIGN PATENT DOCUMENTS

| | | |
|---|---|---|
| KR | 20010078104 | 8/2001 |
| KR | 20030006051 | 8/2001 |
| KR | 20030006051 | 1/2003 |
| WO | WO2006029082 | 3/2006 |

* cited by examiner

US 7,917,112 B2

METHOD AND SYSTEM FOR DYNAMICALLY TUNING AND CALIBRATING AN ANTENNA USING ANTENNA HOPPING

CROSS-REFERENCE TO RELATED APPLICATIONS/INCORPORATION BY REFERENCE

This patent application makes reference to, claims priority to and claims benefit from U.S. patent application Ser. No. 11/536,682 filed on Sep. 29, 2006.

The above stated application is hereby incorporated herein by reference in its entirety.

This application makes reference to:
U.S. application Ser. No. 11/536,678, filed on Sep. 29, 2006;
U.S. application Ser. No. 11/536,650, filed on Sep. 29, 2006;
U.S. application Ser. No. 11/536,644, filed on Sep. 29, 2006;
U.S. application Ser. No. 11/536,676, filed on Sep. 29, 2006;
U.S. application Ser. No. 11/536,659, filed on Sep. 29, 2006;
U.S. application Ser. No. 11/536,673, filed on Sep. 29, 2006;
U.S. application Ser. No. 11/536,679, filed on Sep. 29, 2006;
U.S. application Ser. No. 11/536,672, filed on Sep. 29, 2006;
U.S. application Ser. No. 11/536,648, filed on Sep. 29, 2006;
U.S. application Ser. No. 11/536,669, filed on Sep. 29, 2006;
U.S. application Ser. No. 11/536,666, filed on Sep. 29, 2006;
U.S. application Ser. No. 11/536,675, filed on Sep. 29, 2006;
U.S. application Ser. No. 11/536,685, filed on Sep. 29, 2006;
U.S. application Ser. No. 11/536,645, filed on Sep. 29, 2006;
U.S. application Ser. No. 11/536,655, filed on Sep. 29, 2006;
U.S. application Ser. No. 11/536,660, filed on Sep. 29, 2006;
U.S. application Ser. No. 11/536,657, filed on Sep. 29, 2006;
U.S. application Ser. No. 11/536,662, filed on Sep. 29, 2006;
U.S. application Ser. No. 11/536,688, filed on Sep. 29, 2006;
U.S. application Ser. No. 11/536,667, filed on Sep. 29, 2006;
U.S. application Ser. No. 11/536,651, filed on Sep. 29, 2006;
U.S. application Ser. No. 11/536,656, filed on Sep. 29, 2006; and
U.S. application Ser. No. 11/536,663, filed on Sep. 29, 2006.

Each of the above stated applications is hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for dynamically tuning and calibrating an antenna using antenna hopping.

BACKGROUND OF THE INVENTION

Wireless devices have used antennas to receive RF signals. The size of an antenna may depend on the wavelength of the RF signals that the wireless device is designed to receive. Typically, larger antennas are needed for signals with larger wavelengths. Accordingly, a mobile terminal may use antennas of a few inches for signals in the GHz range. However, for FM radio signals in the 100 MHz range, the antennas may need to be longer. As corded headsets gained in popularity with mobile terminal users, many mobile terminal manufacturers used the headphone cord as an antenna, for example, for a FM receiver.

However, with the advent of Bluetooth headsets, the need for corded headsets was eliminated. The mobile terminal manufacturers have devised alternate means for implementing an FM antenna. One such antenna comprises a conductive coil or loop on a small circuit board that is typically placed at the back of the mobile terminal. Since this small FM antenna is limited in size, the antenna may be tuned to support the FM radio bandwidth. Additionally, because of the circuit board antenna's limited ability to receive FM signals, external factors may be a big factor to reception sensitivity. For example, a mobile terminal user holding the mobile terminal may cause the designed center frequency of the FM antenna to shift due to capacitive and/or inductive changes. Additionally, the mobile terminal's components, such as, the battery, may interfere with reception and/or change the antenna characteristics of the circuit board antenna by distorting and/or shorting the circuit board antenna. Although the reception characteristics of the mobile terminal antenna may change during use of the mobile terminal, the mobile terminal may not be able to determine the amount of center frequency drift.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for dynamically tuning and calibrating an antenna using antenna hopping, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for dynamically tuning and calibrating an antenna using antenna hopping. Aspects of the method may comprise dynamically tuning a mobile terminal antenna, to antenna hop to a plurality of different center frequencies to receive RF signals. Accordingly, antenna hop may occur when the mobile terminal antenna is tuned to a different center frequency than the current center frequency. Antenna hopping may comprise slow antenna hopping or fast antenna hopping. In fast antenna hopping, received signals for a channel at each of the center frequencies may be aggregated. A hopping rate in fast antenna hopping may be greater than twice a highest baseband signal frequency of a desired channel. For example, for a FM channel, the hopping rate may be greater than 36,000 antenna hops per second since a FM channel may have a baseband bandwidth of 18 KHz.

At each center frequency, whether slow antenna hopping or fast antenna hopping is used, a determination may be made as to whether adequate signal is being received for a channel. This determination of signal adequacy may be made by, for example, measuring received signal strength for a desired channel, channel throughput for the desired channel, and/or a bit error rate for the desired channel. A center frequency at which an adequate signal for the desired channel may be received may be referred to as a valid center frequency. In this manner, a list of valid center frequencies may be made for the desired channel where a center frequency that receives adequate signal for the desired channel is added to the list of valid center frequencies. A center frequency that may have been part of the valid center frequency list may be removed from the list if the latest received signal for the desired channel is determined to be inadequate. The mobile terminal antenna may be tuned to the determined center frequencies for the desired channel for slow antenna hopping.

Figure 1:
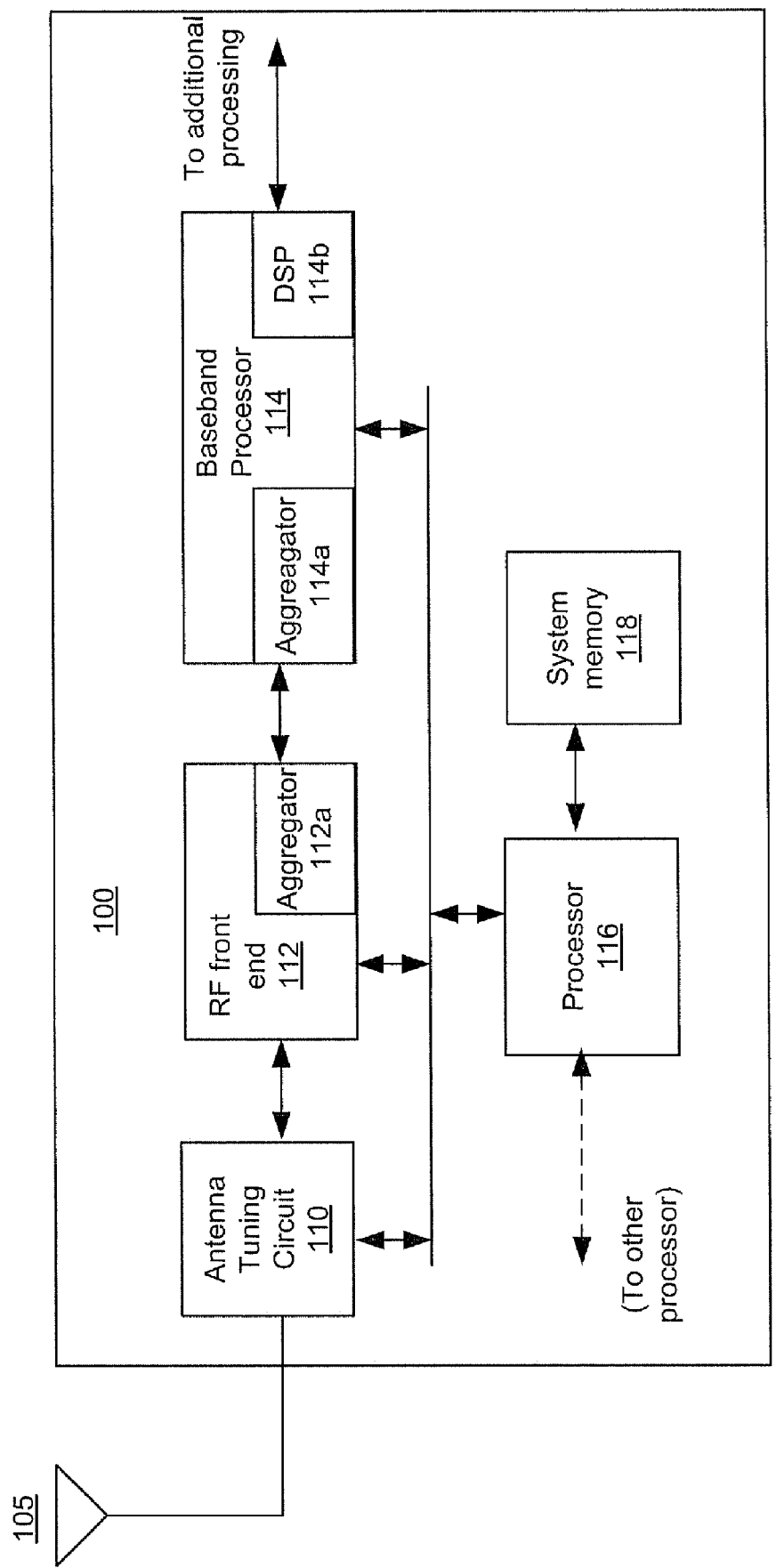
FIG. 1 is a block diagram of an exemplary mobile terminal, in accordance with an embodiment of the invention.

FIG. 1 is a block diagram of an exemplary mobile terminal, in accordance with an embodiment of the invention. Referring to FIG. 1, there is shown a mobile terminal 100, which may comprise, for example, an antenna 105, an antenna tuning circuit block 110, a RF front end 112, a baseband processor 114, a processor 116, and a system memory 118. The antenna tuning circuit block 110 may comprise suitable logic, circuitry, and/or code that may be adapted to adjust a center frequency for the antenna 105. The antenna tuning circuit block 110 may also adjust a bandwidth of signals that may be received by the antenna 105. The antenna tuning circuit block 110 may further be used to impedance match the antenna 105 to the RF front end 112.

The RF front end 112 may comprise suitable logic, circuitry, and/or code that may be adapted to process received RF signals and/or RF signals to be transmitted. The RF front end 112 may be coupled to the antenna 105 via the antenna tuning circuit 110 for signal reception and/or transmission. With respect to received signals, the RF front end 112 may demodulate the received signals before further processing. Moreover, the RF front end 112 may comprise other exemplary functions, such as, filtering the received signal, amplifying the received signals, and/or downconverting the received signals to very low intermediate frequency (VLIF) signal and/or baseband signal. The RF front end 112 may comprise a IF processor which may digitize an IF signal, and digitally process the digitized IF signal to filter and/or downconvert the digitized IF signal to a digital baseband signal. The IF processor may then convert the digitized baseband signal to an analog baseband signal.

The RF front end 112 may also comprise an analog signal aggregator 112a, which may be controlled, for example, by the processor 116. The analog signal aggregator 112a may comprise suitable logic, circuitry, and/or code that may be adapted to aggregate analog signal over a period of time. For example, the signal aggregator may be a voltage adder that may accumulate voltage and then communicate the voltage when indicated by, for example, the processor 116, or other logic.

The RF front end 112 may also receive digital or analog baseband signals from, for example, the baseband processor 114. For example, the baseband processor 114 may generate one or more signals that may be communicated to the RF front end 112, which may be utilized to control one or more functions executed by the RF front 112. Accordingly, in one embodiment of the invention, one or more signals generated by the baseband processor 114 and/or processor 116 may be utilized to program various components such as, for example, filters, phase lock loops (PLLs) or synthesizers, in the RF front end 112. The RF front end 112 may appropriately filter, amplify, and/or modulate an analog signal for transmission via the antenna 105. The RF front end 112 may also convert a digital signal to an analog signal as part of processing for transmission.

The baseband processor 114 may comprise suitable logic, circuitry, and/or code that may be adapted to process analog or digital baseband signals generated by the RF front end 112. The baseband processor 114 may also communicate baseband signals to the RF front end 112 for processing before transmission. The baseband processor 114 may also comprise suitable logic, circuitry, and/or code that may enable aggregation of received signals. For example, the baseband processor may process four consecutive digital samples from received signals to generate a single digital sample. The generation of the digital sample may be design and/or implementation dependent. For example, the generated digital sample may be an average of the four digital samples. An embodiment of the invention may use a discrete circuit block for aggregation, such as, for example, a digital signal aggregator 114a, while other embodiments may utilize a processor, such as, for example, a DSP 114b.

The processor 116 may comprise suitable logic, circuitry, and/or code that may be adapted to control the operations of the antenna tuning circuit 110, the RF front end 112, and/or the baseband processor 114. For example, the processor 116 may be utilized to update and/or modify programmable parameters and/or values in a plurality of components, devices, and/or processing elements in the antenna tuning circuit 110, the RF front end 112, and/or the baseband processor 114. Exemplary programmable parameters may comprise gain of an amplifier, bandwidth of a filter, and/or PLL parameters. Control and/or data information may be transferred from another controller and/or processor in the mobile terminal 100 to the processor 116. Similarly, the processor 116 may transfer control and/or data information to another controller and/or processor in the mobile terminal 100.

The processor 116 may utilize the received control and/or data information to determine the mode of operation of the RF front end 112. For example, the processor 116 may select a specific frequency for a local oscillator, or a specific gain for a variable gain amplifier. Moreover, the specific frequency selected and/or parameters needed to calculate the specific frequency, and/or the specific gain value and/or the parameters needed to calculate the specific gain, may be stored in the system memory 118 via the controller/processor 116. This information stored in system memory 118 may be transferred to the RF front end 112 from the system memory 118 via the controller/processor 116. The system memory 118 may comprise suitable logic, circuitry, and/or code that may be adapted to store a plurality of control and/or data information, including parameters needed to calculate frequencies and/or gain, and/or the frequency value and/or gain value. The system memory 118 may also store, for example, various parameters for antenna hopping. The antenna hopping parameters may comprise, for example, various antenna tuning circuit parameters to determine center frequencies and bandwidths of the antenna 105, as well as impedance match the antenna 105 to the RF front end 112.

In operation, RF signals may be communicated to the antenna tuning circuit 110 by the antenna 105. The antenna tuning circuit 110 may present an impedance to the antenna 105, and accordingly, the antenna 105 in conjunction with the antenna tuning circuit 110 may have a center frequency and a bandwidth about the center frequency. The antenna tuning circuit 110 may also impedance match the antenna 105 to the RF front end 112. Accordingly, the antenna 105 may present optimal reception for those signals within the bandwidth. However, various environmental conditions, including the presence of the human body such as a user's hand holding onto the mobile terminal 100, may cause the center frequency to drift from the desired center frequency. For example, the inductive or capacitive characteristics of the human hand may change the center frequency whenever the hand comes in contact with the mobile terminal. The mobile terminal 100 may detect the center frequency drift and may dynamically configure the antenna tuning circuit block 110 in order to bring the center frequency closer to a desired center frequency.

The center frequency drift may be detected, for example, by the RF front end 112, which may receive weak signals at the desired frequencies. The center frequency drift may also be detected, for example, by processing the received signals. For example, if the received signals comprise digital information, the baseband processor 114 may detect an increase in bit error rate, which may be indicative of center frequency drift.

The signal strength indication and/or bit error rate may be communicated to the processor 116, and the processor 116 may determine that the antenna tuning circuit block 110 may need to be reconfigured. Accordingly, the processor 116 may communicate appropriate control and/or data to the antenna tuning circuit block 110 to reconfigure and/or retune the antenna tuning circuit block 110. By processing information regarding the received signals, the processor 116 may dynamically adjust the center frequency in order to reduce the effects of center frequency drift. The processor 116 may also reconfigure the antenna tuning circuit block 110 to adjust the bandwidth of the antenna 105 and/or impedance matching of the antenna 105 and the RF front end 112

An embodiment of the invention may have been described with the antenna tuning circuit block 110 as a separate functional block, however, the invention need not be so limited. For example, the antenna tuning circuit block 110 may be part of the RF front end 112. Also, while the processor 116 may have been descried as determining when and how to configure the antenna tuning circuit 110, the invention need not be so limited. For example, the antenna tuning circuit block 110 may comprise functionality that may adjust the center frequency, the bandwidth of the antenna 105, and/or the impedance matching of the antenna 105 to the RF front end 112 independently of, or in conjunction with, the processor 116. Additionally, while FIG. 1 may have been described as communicating to at least one other processor or controller, the invention need not be so limited. Accordingly, there may be instances when the processor 116 may not have to communicate with other processors in controlling RF communications. For example, a design of the mobile terminal may not utilize other processors than the processor 116 or the processor 116 may have access to all information needed to control RF communications.

Figure 2A:
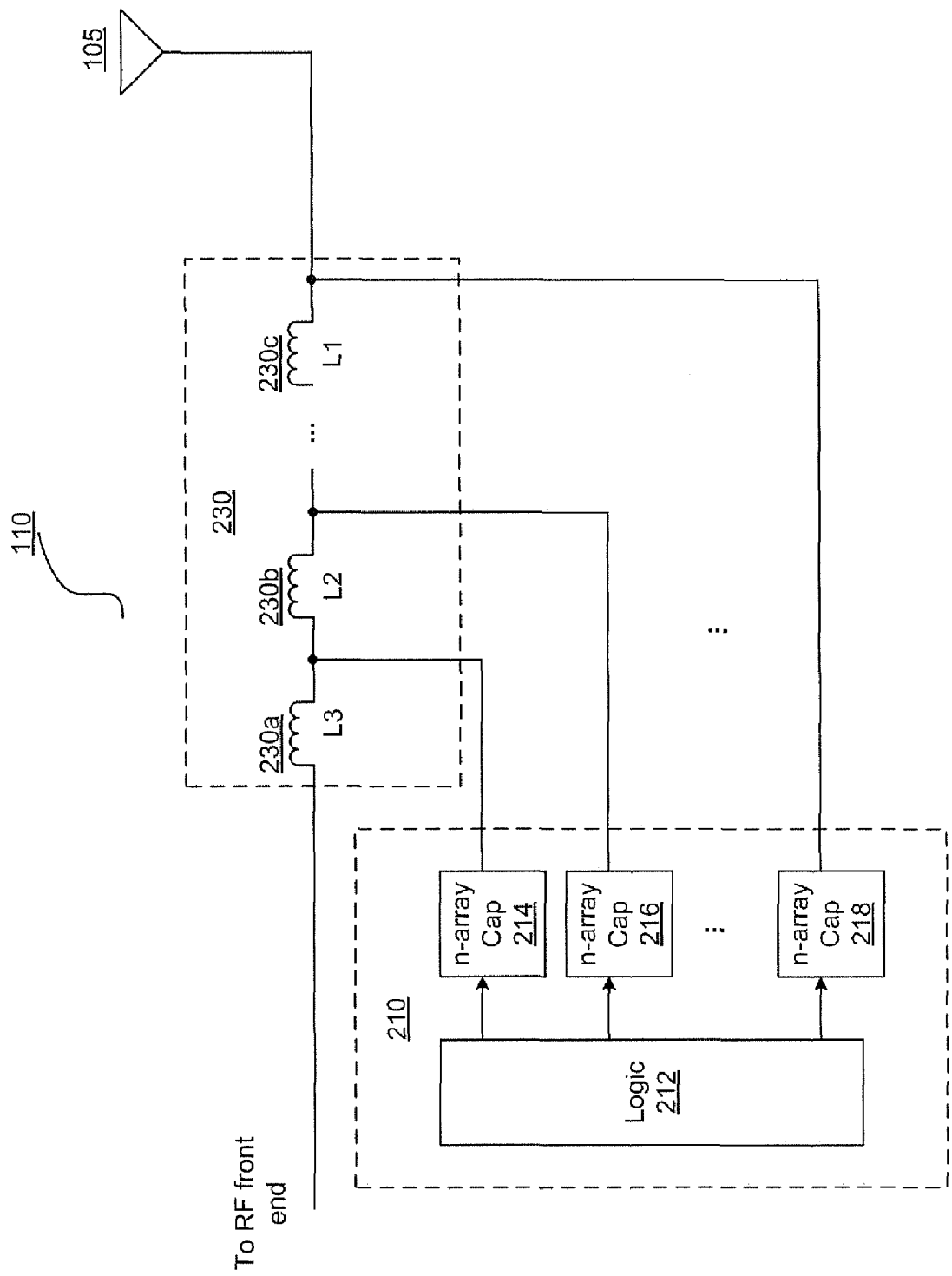
FIG. 2A is a block diagram illustrating an exemplary inductive circuit block that may be utilized for dynamically tuning an antenna, in accordance with an embodiment of the invention.

FIG. 2A is a block diagram illustrating an exemplary inductive circuit block that may be utilized for dynamically tuning an antenna, in accordance with an embodiment of the invention. Referring to FIG. 2A, in an embodiment of the invention, the antenna tuning circuit block 110 may comprise a tuning control block 210 and an inductive circuit block 230. The tuning control block 210 may comprise a control block 212 and a plurality of capacitor arrays 214, 216, . . . 218. The control block 212 may comprise suitable logic, circuitry, and/or code that may enable control of capacitance that may be associated with each of the capacitor arrays 214, 216, . . . 218. In some embodiments of the invention, the capacitor arrays 214, 216, . . . 218 may be on the same chip as the inductive circuit block 220. In other embodiments of the invention, the inductive circuit block 220 may be located separately from the on-chip capacitor arrays 214, 216, . . . 218.

The capacitor arrays 214, 216, . . . 218 may each comprise a plurality of capacitive elements whose capacitances may be added to effectively form different capacitors with different capacitances. The capacitor array 214, 216, or 218 is described in more detail with respect to FIG. 2C. The inductive circuit block 220 may comprise a plurality of inductive elements that may be coupled to the capacitor arrays 214, 216, . . . 218.

The inductive circuit block 230 illustrates an exemplary configuration for the inductive elements of the inductive circuit block 220. The inductive circuit block 230 may comprise a plurality of inductive elements 230a, 230b, . . . 230c in series. Each of the capacitor arrays 214, 216, . . . , 218 may be coupled to a node in the inductive circuit block 230. For example, the capacitor array 214 may be coupled to the node between the inductors 220a and 220b, the capacitor array 216 may be coupled to the node between the inductors 220b and 220c, and the capacitor array 218 may be coupled to the node of the inductor 220c that is not coupled to the inductor 220b.

In operation, the tuning control block 210 may configure the capacitive arrays 214, 216, . . . 218 for use with the inductive circuit block 230. The control block 212 may select a capacitance for each of the capacitive arrays 214, 216, . . . , 218 by enabling individual capacitive elements to be used for receiving RF signals from the antenna 105. Accordingly, the impedance of the circuit may be varied, and thereby cause the center frequency and/or the bandwidth associated with the antenna 105 may be adjusted. Varying the impedance of the circuit may also impedance match the antenna 105 to the RF front end 112.

While the inductive devices 230a, 230b, . . . , 230c in the inductive circuit block 230 may have been described as being in series, the invention need not be so limited. The inductive devices 230a, 230b, . . . , 230c may be placed in other configurations, such as, for example, parallel, a pi, or star configuration, as well as any combination of serial, parallel, pi, or star configurations. Dynamically tuning and calibrating an antenna using an on-chip digitally controlled array of capacitors is disclosed in U.S. patent application Ser. No. 11/536,678, which is filed on even date herewith and is incorporated by reference in its entirety.

Figure 2B:
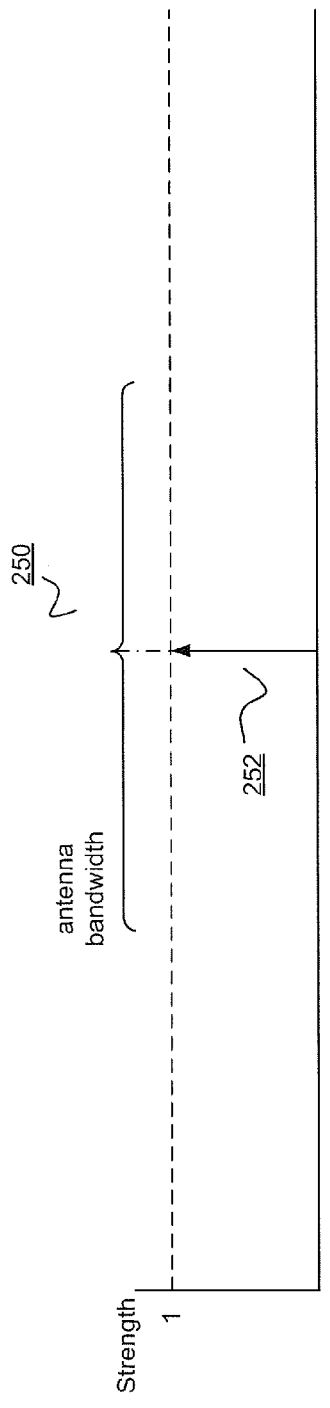
FIG. 2B is a chart illustrating exemplary signal strength for a channel at a center frequency of an antenna bandwidth, in accordance with an embodiment of the invention.

FIG. 2B is a chart illustrating exemplary signal strength for a channel at a center frequency of an antenna bandwidth, in accordance with an embodiment of the invention. Referring to FIG. 2B, there is shown a chart where the horizontal axis indicates frequency and the vertical axis indicates signal strength. The antenna 105 may be tuned to have a bandwidth 250 shown. For exemplary purposes, FIG. 2B may represent receiving signals in the FM radio bandwidth of approximately 88 MHz to 108 MHz. Additionally, for further exemplary purposes, the antenna bandwidth 250 may be less than the FM bandwidth of 88 MHz to 108 MHz. For example, the antenna bandwidth 250 may be 5 MHz. The actual bandwidth of the antenna 105 may be design and or implementation dependent, and may be changed by dynamically tuning the antenna 105. An exemplary description of dynamic tuning of an antenna is disclosed with respect to FIG. 2A, and is disclosed further in U.S. patent application Ser. No. 11,536,678, which is filed on even date herewith and is incorporated by reference in its entirety.

A desired channel 252 may be shown to be at frequency $f_{DC}$, where the frequency $f_{DC}$ may also be the actual center frequency $f_{CFA}$ for the antenna 105. Accordingly, the antenna 105 may be correctly tuned to receive the desired channel 252. For exemplary purposes, the received signal level of the desired channel 252 may be indicated to be a normalized signal strength of 1. Various embodiments of the invention may adjust the center frequency such that the actual center frequency $f_{CFA}$ may be the same as the desire channel frequency $f_{DC}$. Various embodiments of the invention may also reconfigure the antenna tuning circuit block 110 to adjust the bandwidth of the antenna 105 and/or impedance matching of the antenna 105 to the RF front end 112.

Figure 2C:
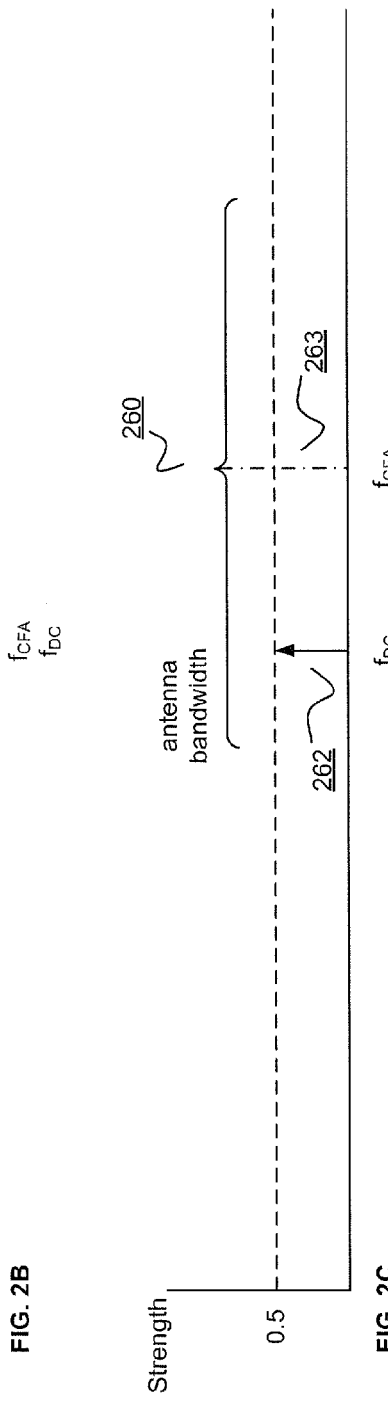
FIG. 2C is a chart illustrating exemplary signal strength for a channel offset from a center frequency of an antenna bandwidth, in accordance with an embodiment of the invention.

FIG. 2C is a chart illustrating exemplary signal strength for a channel offset from a center frequency of an antenna bandwidth, in accordance with an embodiment of the invention. Referring to FIG. 2C, there is shown a chart where the horizontal axis indicates frequency and the vertical axis indicates signal strength as in FIG. 2B. The antenna 105 may presently have an actual center frequency 263 of $f_{CFA}$ that may be different than the desired channel frequency $f_{DC}$. This may be due to environmental factors such as, for example, additional capacitance and/or inductance introduced by a user's hand holding on to the mobile terminal 100. Accordingly, while the center frequency of the antenna 105 may have been tuned to coincide with the desired channel $f_{DC}$, the user may have affected the antenna characteristics such that the center frequency and/or the antenna bandwidth 260 may have been changed. Accordingly, the signal strength of the desired channel 262 at the frequency $f_{DC}$ may be weaker than if it coincides with the actual center frequency 263 of $f_{CFA}$. The signal strength of the desired channel 262 may be denoted, for example, by the normalized signal strength of 0.5.

Figure 2D:
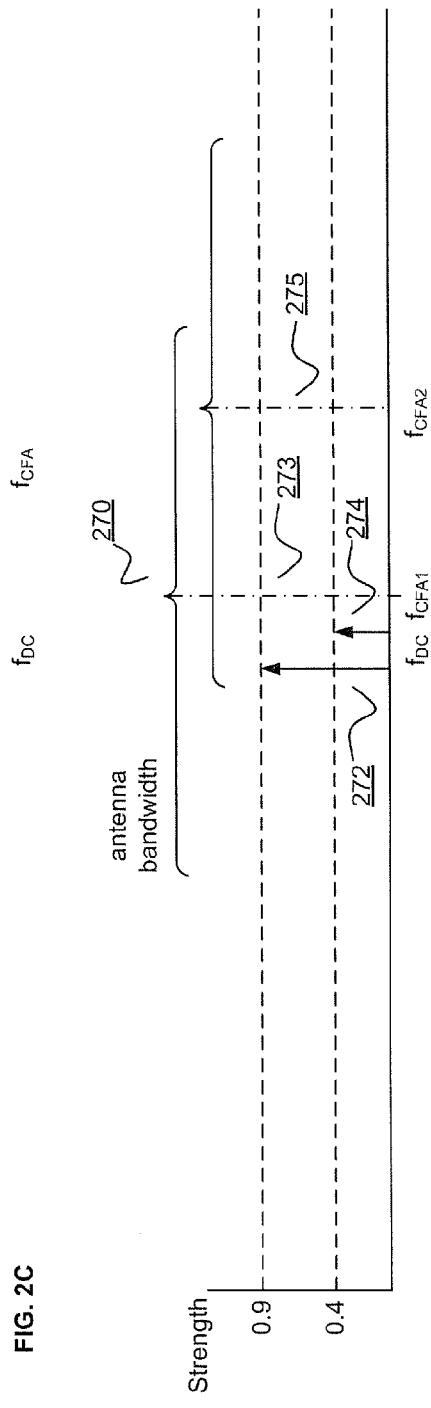
FIG. 2D is a chart illustrating exemplary signal strengths for a channel as a center frequency is changed due to antenna hopping, in accordance with an embodiment of the invention.

FIG. 2D is a chart illustrating exemplary signal strengths for a channel as a center frequency is changed due to antenna hopping, in accordance with an embodiment of the invention. Referring to FIG. 2D, there is shown a chart where the horizontal axis indicates frequency and the vertical axis indicates signal strength as in FIG. 2B. The mobile terminal 100 may not be able to determine the frequency offset of a desired center frequency for a desired channel to the actual center frequency. Accordingly, an embodiment of the invention may antenna hop by tuning the antenna 105 to change the center frequency of the antenna 105 to various frequencies.

For example, the desired channel frequency, and the desired center frequency, may be at the frequency $f_{DC}$ while the actual center frequency may have drifted to, for example, actual center frequency 263 of $f_{CFA}$. While the mobile terminal 100 may have no indication that the actual center frequency 263 is a different frequency than the desired center frequency, an antenna hopping algorithm may still be applied. Accordingly, signals for the desired channel may be received for various center frequencies. For example, the first antenna hop may configure the antenna tuning circuit 110 to a center frequency 273 at the frequency $f_{CA1}$. Since the center frequency 273 may be close to the desired channel frequency $f_{DC}$, the signal strength 272 for the desired channel for the center frequency $f_{CA1}$ may be a normalized value of 0.9.

The next antenna hop may configure the antenna tuning circuit 110 to a center frequency 275 at the frequency $f_{CA2}$. Since the center frequency 275 may be farther away from the desired channel frequency $f_{DC}$ than the center frequency 273 may be from the desired channel frequency $f_{DC}$, the signal strength 274 for the desired channel for the center frequency $f_{CA2}$ may be at a smaller normalized value of 0.4. Antenna hops may be configured so that adjacent antenna bandwidths may overlap. For example, the antenna bandwidth associated with the center frequency 273 may overlap a portion of the antenna bandwidth associated with the center frequency 275. By antenna hopping to a plurality of center frequencies, the processor 116, for example, may build a list of valid center frequencies that may allow adequate signal reception for a desired channel. This may be referred to as a slow antenna hop where the antenna hopping rate may be greater than an antenna hopping rate for a fast antenna hop.

As part of fast antenna hop, the mobile terminal 100 may aggregate signals received for a desired channel over a limited number of center frequencies. Signal aggregation may occur, for example, at the RF front end 112 or the baseband processor 114. The aggregation may be achieved, for example, via voltage summing by the analog signal aggregator 112a or processing of digital baseband data by the digital signal aggregator 114a or the DSP 114b. Accordingly, fast antenna hop may enable antenna hop at a rate that may be larger than the Nyquist sampling rate for the signal content of the desired channel being received. For example, if the desired channel is an analog FM channel, the Nyquist rate may be 36,000 KHz or more. Therefore, fast antenna hop may enable antenna hopping to a different center frequency every 28 microseconds or faster. The number of center frequencies used for fast antenna hop may be design and/or implementation dependent. The list of valid center frequencies used for fast antenna hop may be generated during slow antenna hop, and/or may be modified during fast antenna hop. The signal strength may also be measured, for example, during fast antenna hop. For example, if the signal strength for the desired channel is below the threshold that determines whether the signal strength is adequate, the processor 116, for example, may remove the center frequency from the list of valid center frequencies that may be used.

A slow antenna hop may remain at a center frequency for a period of, for example, several milliseconds. Due to the length of time that signals for a desired channel are received during the slow antenna hop, the mobile terminal 100 may not aggregate signals for the desired channel during slow antenna hop. The list of valid center frequencies for a desired channel may comprise, for example, those center frequencies where the average power level for the desired channel may be above a threshold value. The threshold value may be, for example, pre-determined. The power averaging over a relatively longer period of time may reduce distortions due to instantaneous spikes or dips in signal levels. Other embodiments of the invention that receive digital signals may, for example, determine a bit error rate for a desired channel at different antenna center frequencies to determine adequacy of signals for a desired channel at those center frequencies.

In this manner, the mobile terminal 100 may be able to receive signals for the desired channel from different center frequencies associated with the antenna 105 at various times. Accordingly, the mobile terminal 100 may be able to compensate for center frequency drift without knowing the specific amount of drift. Other embodiments of the invention may use an antenna hopping algorithm selectively. For example, an antenna hopping algorithm may be used when the received signal strength is less than a threshold value.

Various embodiments of the invention may implement different usage of antenna hopping, such as, for example, slow antenna hop and fast antenna hop. For example, fast antenna hop may be used when a desired channel has sufficient number of center frequencies, for example, four, in the list of valid center frequencies. Another embodiment of the invention may only use one center frequency if the power level of the desired channel for that center frequency is strong enough. Another embodiment of the invention may start with slow antenna hopping to update the list of valid center frequencies, and then switch to fast antenna hopping after, for example, making a pre-determined number of antenna hops.

Figure 3A:
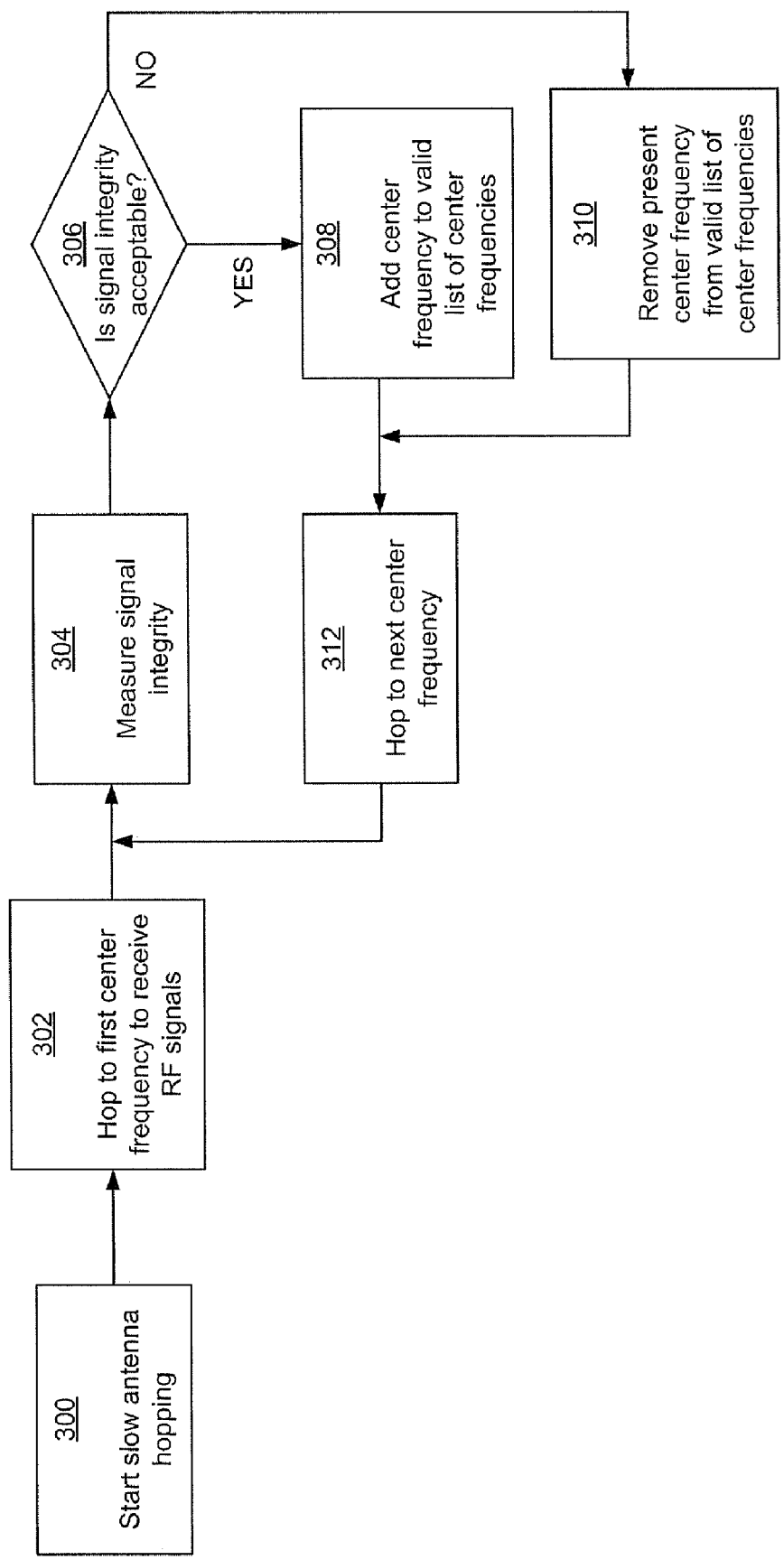
FIG. 3A is a flow diagram of exemplary steps for slow antenna hopping, in accordance with an embodiment of the invention.

FIG. 3A is a flow diagram of exemplary steps for slow antenna hopping, in accordance with an embodiment of the invention. Referring to FIG. 3A, there is shown steps 300 to 312. In step 300, the processor 116, for example, may start a slow antenna hop for the antenna 105 by configuring the antenna tuning circuit 110 for the first center frequency. In step 302, the antenna tuning circuit 110 may be tuned to the first center frequency and signals from the desired channel may be received and processed by, for example, the RF front end 112.

In step 304, the RF front end 112 may, for example, measure the received signal strength to determine signal integrity. The received signal strength value may be communicated to, for example, the processor 116. In step 306, the processor 116 may compare the received signal strength value to, for example, a pre-determined signal strength value that may be stored, for example, in the system memory 118. If the received signal strength value is, for example, greater than or equal to the pre-determined signal strength value, the next step may be step 308. Otherwise, the next step may be step 310.

In step 308, the processor 116 may determine whether the present center frequency may be part of the list of valid center frequencies for the desired channel. If the present center frequency is not part of the list of valid center frequencies, the present center frequency may be added to the list of valid center frequencies for the desired channel. The next step may be step 312 where the processor 116 may reconfigure the antenna tuning circuit 110 to antenna hop to the next center frequency, where an antenna bandwidth for the next center frequency may overlap with the antenna bandwidth for the present center frequency. The next step may be step 304.

In step 310, the processor 116 may determine whether the present center frequency may be part of the list of valid center frequencies for the desired channel to. If so, this center frequency may be deleted from the list of valid center frequencies for the desired channel. The nest step may be step 312.

Figure 3B:
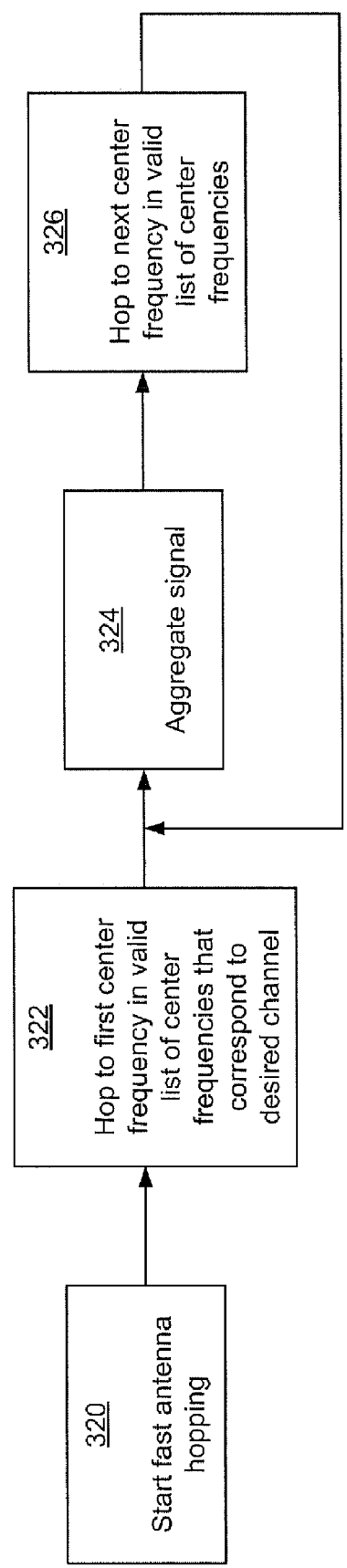
FIG. 3B is a flow diagram of exemplary steps for fast antenna hopping, in accordance with an embodiment of the invention

FIG. 3B is a flow diagram of exemplary steps for fast antenna hopping, in accordance with an embodiment of the invention. Referring to FIG. 3B, there is shown steps 320 to 326. In step 320, the processor 116, for example, may start a fast antenna hop for the antenna 105 by configuring the antenna tuning circuit 110 for a first center frequency from the list of valid center frequencies for a desired channel. The list of valid center frequencies may be stored, for example, in the system memory 118. In step 322, the antenna tuning circuit 110 may be tuned to the first center frequency and signals from the desired channel may be received and processed by, for example, the RF front end 112. The In step 324, the received signal may be aggregated. For example, if there four center frequencies are used for fast antenna hopping, the received signals for the four center frequencies may be aggregated. For example, the aggregation may occur at the RF front end 112 via voltage summing by the analog signal aggregator 112a of the received signals for the desired channel for the center frequencies used in fast antenna hopping. After hopping to the four center frequencies, signals may be aggregated for the next four antenna hops. Aggregation may also occur at the baseband processor 114 by converting the received signals that correspond to the four center frequencies to four digital samples and processing the four digital samples to generate a single digital sample. The digital signal processing may be executed by the digital signal aggregator 114a or the DSP 114b.

In step 326, the processor 116, for example, may continue the fast antenna hop for the antenna 105 by configuring the antenna tuning circuit 110 for a next center frequency from the list of valid center frequencies for a desired channel. If the present center frequency is the last of, for example, the four center frequencies used for fast antenna hopping, then the next center frequency may be the first of the four center frequencies.

In accordance with an embodiment of the invention, aspects of an exemplary system may comprise the antenna tuning circuit block 110 that may receive RF signals by dynamically tuning the antenna 105 to antenna hop to at least one of a plurality of different center frequencies. Antenna hopping may comprise slow antenna hopping and fast antenna hopping. In fast antenna hopping, the mobile terminal 100 may aggregate received RF signals for a channel at each of a plurality of center frequencies via, for example, the baseband processor 114 or the RF front end 112. Fast antenna hopping may use an antenna hopping rate that may be greater than twice a highest baseband signal frequency of a desired channel.

The mobile terminal 100 may determine center frequencies at which a received signal for the desired channel may be deemed to be adequate. The adequacy of received signals may be determined by, for example, the processor 116 and/or the baseband processor 114 by processing received signal strength for the desired channel and/or a bit error rate for the desired channel. The processor 116 and/or the baseband processor 114 may add each center frequency that may be associated with adequate signal for the desired channel to a list of valid center frequencies. The processor 116 and/or the baseband processor 114 may also remove from a list of previously valid center frequencies a center frequency that may be currently determined to have inadequate signal for the desired channel. The list of valid center frequencies may be used during fast antenna hopping to tune the antenna 105 to the center frequencies associated with adequate signal for the desired channel.

Another embodiment of the invention may provide a machine-readable storage, having stored thereon, a computer program having at least one code section executable by a machine, thereby causing the machine to perform the steps as described above for dynamically tuning and calibrating an antenna using antenna hopping.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for wireless communication, the method comprising:
   in a wireless device comprising an antenna that is configurable into a plurality of configurations:
   determining a subset of said plurality of configurations, wherein each configuration of said subset of said plurality of configurations enables received signal strength values above a threshold for a wireless channel; and
   during a time interval in which said wireless device is receiving signals on said wireless channel, configuring said antenna to sequentially utilize each configuration of said subset of said plurality of configurations for receiving said signals.

2. The method according to claim 1, comprising:
   during said time interval, capturing a plurality of said signal strength values of said wireless channel, where each of said plurality of signal strength values is captured utilizing a different one of said configurations of said subset;
   aggregating said plurality of signal strength values; and
   processing said aggregated signal strength values to recover information communicated on said wireless channel.

3. The method according to claim 2, wherein said signal strength values comprise analog voltage levels and said aggregating comprises adding said analog voltage levels.

4. The method according to claim 2, wherein said signal strength values comprise digital values and said aggregating comprises adding said digital values.

5. The method according to claim 2, wherein said aggregating comprises averaging said plurality of signal strength values.

6. The method according to claim 1, comprising determining said subset of configurations based on at least one of: received signal strength value or values for said wireless channel and a bit error rate for said wireless channel.

7. The method according to claim 1, comprising removing a particular configuration from said subset of configurations upon determining that said particular configuration no longer enables adequate reception of said wireless channel.

8. The method according to claim 1, comprising configuring said antenna via a digitally controlled capacitor array.

9. The method according to claim 1, comprising determining said subset of configurations by:
   sequentially configuring said antenna into each of said plurality of configurations; and
   for each one of said plurality of configurations, determining whether said one of said configurations enables adequate reception of said wireless channel.

10. The method according to claim 9, wherein an amount of time spent in each of said plurality of configurations while determining said subset is longer than an amount of time spent in each configuration of said subset of configurations during said time interval.

11. A system for wireless communication, the system comprising:
    one or more circuits and/or processors for use in a wireless device, said one or more circuits and/or processors comprising an antenna that is configurable into a plurality of configurations, and said one or more circuits and/or processors being operable to:
    determine a subset of said plurality of configurations, wherein each configuration of said subset of said plurality of configurations enables received signal strength values above a threshold for a wireless channel; and
    during a time interval in which said wireless device is receiving signals on said wireless channel, configure said antenna to sequentially utilize each configuration of said subset of said plurality of configurations for receiving said signals.

12. The system according to claim 11, wherein said one or more circuits and/or processors are operable to:
    during said time interval, capture a plurality of said signal strength values of said wireless channel, where each of said plurality of signal strength values is captured utilizing a different one of said configurations of said subset;
    aggregate said plurality of signal strength values; and
    process said aggregated signal strength values to recover information communicated on said wireless channel.

13. The system according to claim 12, wherein said signal strength values comprise analog voltage levels and said aggregating comprises adding said analog voltage levels.

14. The system according to claim 12, wherein said signal strength values comprise digital values and said aggregating comprises adding said digital values.

15. The system according to claim 12, wherein said aggregating comprises averaging said plurality of signal strength values.

16. The system according to claim 11, wherein said one or more circuits and/or processors are operable to determine said subset of configurations based on at least one of: received signal strength value or values for said wireless channel and a bit error rate for said wireless channel.

17. The system according to claim 11, wherein said one or more circuits and/or processors are operable to remove a particular configuration from said subset of configurations upon determining that said particular configuration no longer enables adequate reception of said wireless channel.

18. The system according to claim 11, wherein said one or more circuits and/or processors comprise a digitally controlled capacitor array for configuring said antenna.

19. The system according to claim 11, wherein said one or more circuits and/or processors are operable to determine said subset of configurations by:
    sequentially configuring said antenna into each of said plurality of configurations; and for each one of said plurality of configurations, determining whether said one of said configurations enables adequate reception of said wireless channel.

20. The system according to claim 19, wherein an amount of time spent in each of said plurality of configurations while determining said subset is longer than an amount of time spent in each configuration of said subset of configurations during said time interval.

* * * * *